(12) United States Patent
Saeki et al.

(10) Patent No.: US 11,318,812 B2
(45) Date of Patent: May 3, 2022

(54) TEMPERATURE ENVIRONMENT REGULATING SYSTEM, TEMPERATURE PREFERENCE ESTIMATING SYSTEM, AND NON-TRANSITORY COMPUTER-READABLE MEDIUM

(71) Applicant: TOYOTA JIDOSHA KABUSHIKI KAISHA, Toyota (JP)

(72) Inventors: Yoshihiro Saeki, Toyota (JP); Hiroyuki Bandai, Nagakute (JP); Tomoya Yamaguchi, Seto (JP); Kenichi Yanagida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/820,975

(22) Filed: Mar. 17, 2020

(65) Prior Publication Data

US 2020/0331320 A1    Oct. 22, 2020

(30) Foreign Application Priority Data

Apr. 17, 2019   (JP) .............................. JP2019-078686

(51) Int. Cl.
    *B60H 1/00*         (2006.01)

(52) U.S. Cl.
    CPC ..... *B60H 1/00742* (2013.01); *B60H 1/00971* (2013.01)

(58) Field of Classification Search
None
See application file for complete search history.

(56) References Cited

U.S. PATENT DOCUMENTS

| | | | |
|---|---|---|---|
| 5,291,748 A | 3/1994 | Ueda | |
| 2017/0334263 A1 | 11/2017 | Schumacher et al. | |
| 2020/0031195 A1* | 1/2020 | Woods | B60H 1/00964 |
| 2020/0062076 A1* | 2/2020 | Elson | B60H 1/00742 |
| 2020/0094651 A1* | 3/2020 | Ostrowski | B60H 1/00742 |
| 2020/0324783 A1* | 10/2020 | Groene | B60N 2/0248 |

FOREIGN PATENT DOCUMENTS

| | | | |
|---|---|---|---|
| CN | 107284180 A | * 10/2017 | |
| JP | 5-193338 A | 8/1993 | |
| JP | 2009-120143 A | 6/2009 | |
| JP | 2017-536287 A | 12/2017 | |
| JP | 2018-034705 A | 3/2018 | |
| WO | WO-2016070052 A1 * | 5/2016 | B60H 1/00292 |

* cited by examiner

*Primary Examiner* — Kelly D Williams
(74) *Attorney, Agent, or Firm* — Oblon, McClelland, Maier & Neustadt, L.L.P.

(57) ABSTRACT

A temperature environment regulating system includes an in-vehicle temperature conditioner, a thermal sensation estimating section, a preference estimating section, a preference memory section, and a control section. The in-vehicle temperature conditioner regulates passenger-compartment temperature environment in a vehicle. The thermal sensation estimating section estimates thermal sensation, which is an indicator representing how the user senses in-vehicle temperature environment. The preference estimating section estimates temperature preference of the user based on a temporal change in the thermal sensation. The control section controls the in-vehicle temperature conditioner based on the temperature preference memorized by the preference memory section.

6 Claims, 4 Drawing Sheets

TEMPERATURE ENVIRONMENT REGULATING SYSTEM, TEMPERATURE PREFERENCE ESTIMATING SYSTEM, AND NON-TRANSITORY COMPUTER-READABLE MEDIUM

BACKGROUND

1. Field

The present disclosure relates to a temperature environment regulating system, a temperature preference estimating system, and a non-transitory computer-readable medium that are used for vehicles.

2. Description of Related Art

In an air-conditioning control device for a vehicle described in Japanese Laid-Open Patent Publication No. 5-193338, a direct thermal sensation information detecting means detects the skin temperature of an occupant. Using the detected skin temperature as an initial value, an indirect thermal sensation information detecting means detects a change in the occupant's skin temperature. Based on the detected change in the skin temperature, a thermal sensation estimating means estimates thermal sensation of the occupant. The thermal sensation is an indicator representing how the occupant senses temperature. A control amount determining means determines the difference between the estimated thermal sensation and a thermal sensation according to a thermal sensation control pattern that is memorized in advance. An air-conditioning control means controls the output from an air-conditioning unit to eliminate the difference calculated by the control determining means.

The above-described air-conditioning control device controls the output of the air conditioning unit uniformly for equal changes in the skin temperature that are detected by the indirect thermal sensation information detecting means. However, even when users show equal changes in the skin temperature, how each user senses temperature should vary from one user to another. A conventional air-conditioning control device, such as the above-described air-conditioning control device, cannot determine each user's personal preference for air conditioning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a temperature environment regulating system is provided that includes an in-vehicle temperature conditioner, a thermal sensation estimating section, a preference estimating section, a preference memory section, and a control section. The in-vehicle temperature conditioner is configured to regulate a passenger-compartment temperature environment in a vehicle. The thermal sensation estimating section is configured to estimate thermal sensation, which is an indicator representing how a user senses an in-vehicle temperature environment, based on at least one of biological information of the user, manipulation information, which is information regarding manipulation of the vehicle by the user, and vehicle environment information, which is information regarding external environment of the vehicle. The preference estimating section is configured to estimate temperature preference of the user based on a temporal change in the thermal sensation. The preference memory section is configured to memorize the temperature preference. The control section is configured to control the in-vehicle temperature conditioner. The control section is configured to control the in-vehicle temperature conditioner based on the temperature preference memorized by the preference memory section.

The above-described configuration can determine and memorize each user's temperature preference regarding the passenger-compartment temperature environment in the vehicle. The in-vehicle temperature conditioner is controlled based on the memorized temperature preference. This ensures a comfortable in-vehicle temperature environment for every user whose temperature preference is memorized by the preference memory section, regardless of varied temperature preferences from one user to another.

The above-described temperature environment regulating system may include a user identifying section configured to obtain user identifying information for identifying a user and identify the user based on the user identifying information. The preference memory section memorizes the temperature preference in association the user identifying information. When the user identifying section identifies the user, the control section may control the in-vehicle temperature conditioner based on the temperature preference associated with the identified user.

The above-described configuration can control the in-vehicle temperature conditioner in correspondence with the temperature preference information of the identified user. Therefore, even if different users use one vehicle, the in-vehicle temperature environment is regulated in correspondence with the temperature preference of each of the users.

In the above-described temperature environment regulating system, a server including the preference memory section and a communication module mounted in the vehicle may be connected to each other through an external communication network. When the user identifying section identifies the user, the control section may receive the temperature preference associated with the identified user from the server by means of the communication module and control the in-vehicle temperature conditioner based on the temperature preference.

Even if the user switches to another vehicle, the above-described configuration allows the vehicle to receive the temperature preference of the user from the server. Therefore, even if the user switches to another vehicle, the in-vehicle temperature conditioner is controlled in correspondence with the air-conditioning preference of the user.

In the above-described temperature environment regulating system, the preference estimating section may estimate air-conditioning preference of the user based on the temporal change in the estimated thermal sensation and a thermal sensation estimated when a predetermined time has elapsed since start of regulation of the in-vehicle temperature environment.

In the above-described configuration, the temperature preference is classified based on not only the preference regarding a stabilized temperature that is achieved when the predetermined time has elapsed since the start of regulation of the in-vehicle temperature environment, but also the information that is obtained in the period from when the regulation of the in-vehicle temperature environment is started to when the temperature becomes stabilized. Therefore, the temperature preference reflects not only the information on whether the user is sensitive to heat or cold, but also the user's preference regarding how the in-vehicle temperature environment should change.

In another general aspect, a temperature preference estimating system is provided that includes a thermal sensation estimating section, a preference estimating section, and a preference memory section. The thermal sensation estimating section estimates thermal sensation, which is an indicator representing how a user senses an in-vehicle temperature environment, based on at least one of biological information of the user, manipulation information, which is information regarding manipulation of the vehicle by the user, and vehicle environment information, which is information regarding external environment of the vehicle. The preference estimating section estimates temperature preference of the user based on a temporal change in the thermal sensation. The preference memory section memorizes the temperature preference.

In a further general aspect, a non-transitory computer-readable medium is provided that stores a program that causes a computer to execute: a thermal sensation estimating process that estimates thermal sensation, which is an indicator representing how a user senses an in-vehicle temperature environment, based on at least one of biological information of the user, manipulation information, which is information regarding manipulation of the vehicle by the user, and vehicle environment information, which is information regarding external environment of the vehicle; a preference estimating process that estimates temperature preference of the user based on a temporal change in the thermal sensation; and a preference memory process that memorizes the temperature preference.

The above-described configurations each can determine and memorize the temperature preference of each user regarding the passenger-compartment temperature environment of the vehicle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a vehicle employing a temperature environment regulating system will now be described with reference to the attached drawings.

The general configuration of the temperature environment regulating system will first be described.

Figure 1:
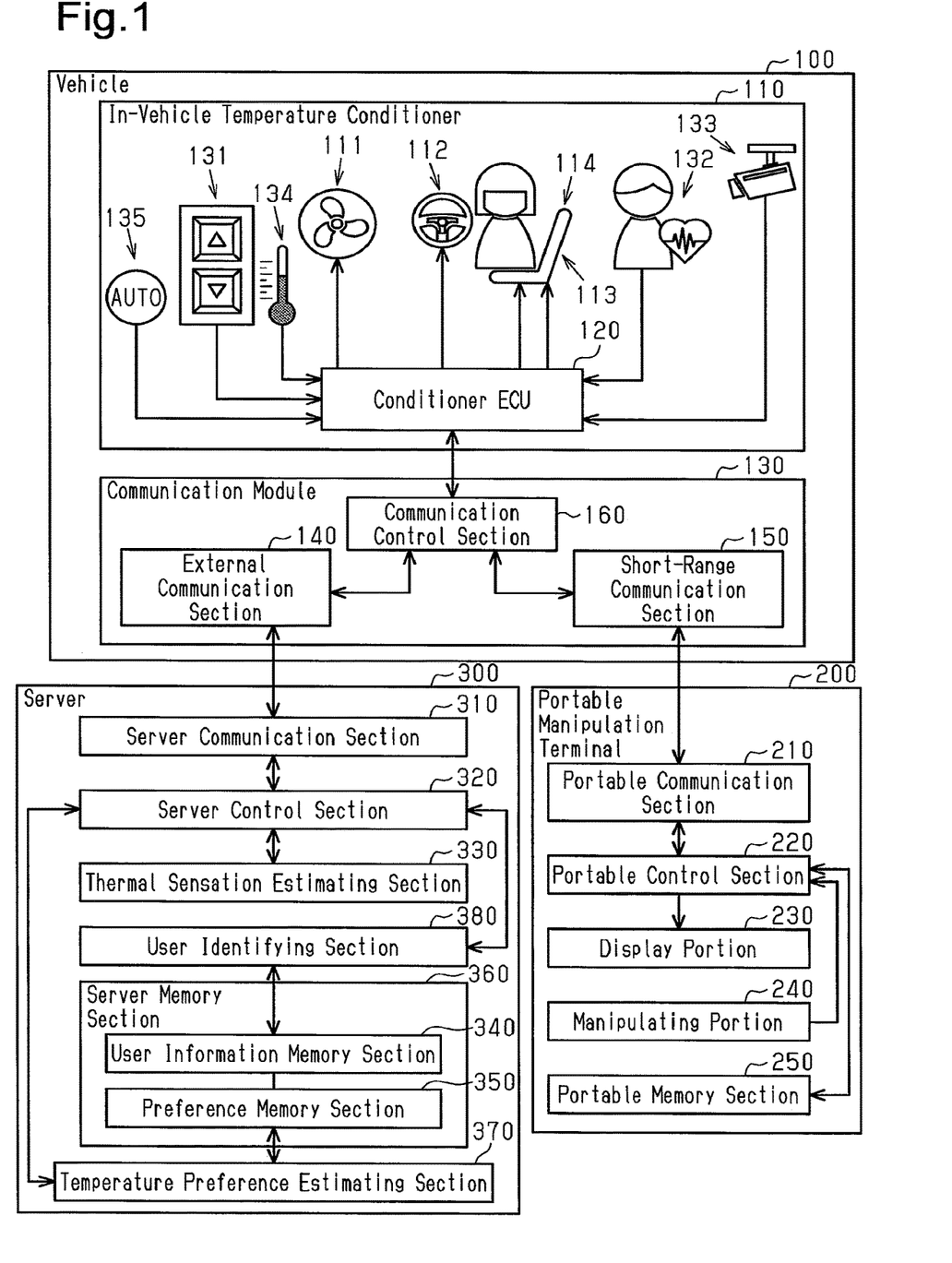
FIG. 1 is a diagram schematically representing a temperature environment regulating system.

As shown in FIG. 1, a temperature environment regulating system of the present embodiment is constituted by a vehicle 100, a portable manipulation terminal 200 of a user of the vehicle 100, and a server 300. The server 300 is configured to consolidate and memorize data. The vehicle 100 and the portable manipulation terminal 200 are capable of communicating information with each other by wireless short-range communication. The vehicle 100 and the server 300 are also capable of communicating information with each other through an external communication network.

The vehicle 100 includes an in-vehicle temperature conditioner 110. The in-vehicle temperature conditioner 110 is configured to regulate the temperature environment in the passenger compartment of the vehicle 100. The vehicle 100 also includes a conditioner ECU 120 (control section). The conditioner ECU 120 is configured to control the operation of the in-vehicle temperature conditioner 110.

The in-vehicle temperature conditioner 110 includes an air-conditioning mechanism 111. The air-conditioning mechanism 111 is configured to regulate the temperature in the passenger compartment of the vehicle 100. The air-conditioning mechanism 111 regulates the passenger-compartment temperature by supplying warm air or cool air into the passenger compartment of the vehicle 100.

The in-vehicle temperature conditioner 110 includes a steering heater 112 that heats the steering wheel. The steering heater 112 heats the steering wheel by electrifying a heating wire incorporated in the steering wheel.

The in-vehicle temperature conditioner 110 includes a seat ventilation mechanism 113. The seat ventilation mechanism 113 ventilates the gap between the seat on which the user is seated and the body of the user by supplying air from the seat to the user.

The in-vehicle temperature conditioner 110 includes a seat heater 114 that heats the seat on which the user is seated. The seat heater 114 heats the seat by electrifying a heating wire incorporated in the seat.

The vehicle employing the temperature environment regulating system has various types of sensors. The sensors input signals to the conditioner ECU 120 of the in-vehicle temperature conditioner 110.

The conditioner ECU 120 receives, from an air-conditioning temperature setting switch mounted in a manipulation panel 131, a signal that represents a target temperature for the passenger compartment of the vehicle 100 that is set by the user. The conditioner ECU 120 also receives, from a power source switch for the steering heater 112 disposed in the manipulation panel 131, a signal that represents whether the steering heater 112 should be turned on or off. The conditioner ECU 120 further receives, from a power source switch for the seat ventilation mechanism 113 mounted in the manipulation panel 131, a signal that represents whether the seat ventilation mechanism 113 should be turned on or off. The conditioner ECU 120 also receives, from a power source switch for the seat heater 114 disposed in the manipulation panel 131, a signal that represents whether the seat heater 114 should be turned on or off. The manipulation panel 131 is constituted by manipulation components attached to an instrument panel, such as switches, buttons, and touch panels. FIG. 1 shows the manipulation panel 131 in a simplified manner. In the present embodiment, the signals from the manipulation panel 131 each function as manipulation information. The manipulation information is information regarding manipulation of the vehicle 100 by the user.

A heart rate sensor 132 inputs, to the conditioner ECU 120, a signal that represents the user's heart rate. The heart rate sensor 132 is a potential type sensor. An electrode is attached to the steering wheel and produces a pulse-like voltage at the time of myocardial contraction. The heart rate sensor 132 detects this pulse-like voltage and determines the user's heart rate based on the detected voltage. The user's heart rate corresponds to biological information of the user.

A thermographic camera 133 inputs an image to the conditioner ECU 120. The image is a thermogram representing the temperature distribution in the vehicle. The thermographic camera 133 is an infrared camera and creates, in a non-contact manner, a thermogram representing the temperature distribution in the vicinity of the user's head in the vehicle. Using the thermogram representing the interior of the vehicle, which is created by the thermographic camera 133, the conditioner ECU 120 calculates the skin temperature of the user. The user's skin temperature corresponds to the biological information of the user.

An outside temperature sensor 134 inputs, to the conditioner ECU 120, a signal that represents an outside temperature, which is the temperature outside the passenger compartment of the vehicle 100. The outside temperature corresponds to vehicle environment information, which is information regarding the external environment of the vehicle 100.

An automatic control switch 135 inputs to the conditioner ECU 120 a signal that represents whether the in-vehicle temperature conditioner 110 should be operated by fully automatic control. When the automatic control switch 135 is on, the conditioner ECU 120 controls the in-vehicle temperature conditioner 110 in a fully automatic manner. In other words, the conditioner ECU 120 regulates the temperature and the amount of air supplied by the air-conditioning mechanism 111 and the on-off states of the steering heater 112, the seat ventilation mechanism 113, and the seat heater 114 automatically, with or without manipulation by the user. In contrast, when the automatic control switch 135 is off, the conditioner ECU 120 controls the in-vehicle temperature conditioner 110 not in a fully automatic manner but in correspondence with manipulation of the manipulation panel 131 by the user. The fully automatic control, as mentioned in the present embodiment, refers to the controlling of the in-vehicle temperature conditioner 110 based on temperature preference of the user, which will be described later.

A communication module 130 is mounted in the vehicle 100 and includes an external communication section 140. The external communication section 140 communicates information with the server 300 through an external communication network.

The external communication network of the present embodiment is a mobile phone communication network used for mobile phone communication.

The communication module 130, which is mounted in the vehicle 100, includes a short-range communication section 150. The short-range communication section 150 communicates information with the portable manipulation terminal 200 by wireless short-range communication. The communication method of the present embodiment is Bluetooth (registered trademark).

The communication module 130 of the vehicle 100 includes a communication control section 160. The communication control section 160 controls the information communication by the external communication section 140 and the short-range communication section 150. The communication control section 160 controls the information communication with the portable manipulation terminal 200 and the server 300 and the signal transmission-reception with the conditioner ECU 120 and performs various calculations.

The communication control section 160 requests user identifying information from the portable manipulation terminal 200. The user identifying information is information for identifying the user and, in the present embodiment, the identification number of the portable manipulation terminal 200.

The communication control section 160 continuously obtains the biological information, the manipulation information, and the vehicle environment information. The communication control section 160 transmits the biological information, manipulation information, and vehicle environment information that are obtained during a predetermined time to the server 300. In the present embodiment, the predetermined time is set to an hour following the start of operation of the in-vehicle temperature conditioner 110.

In the embodiment, the portable manipulation terminal 200 is a mobile phone such as a smartphone owned by the user of the vehicle 100. The portable manipulation terminal 200 includes a portable communication section 210. The portable communication section 210 communicates information with the vehicle 100 by wireless short-range communication. The portable communication section 210 communicates by the same communication standards as the short-range communication section 150 of the vehicle 100.

The portable manipulation terminal 200 includes a display section 230 that displays an output from a portable control section 220, which will be described later. The display section 230 displays a message or manipulation icon based on the image information output by the portable control section.

The portable manipulation terminal 200 includes a manipulating section 240, through which information is input to the portable control section 220, as will be described later. In response to manipulation of the manipulating section 240, a manipulation signal is input to the portable control section 220. In the present embodiment, the display section 230 is a touch panel and functions also as the manipulating section 240.

The portable manipulation terminal 200 includes a portable memory section 250 that memorizes application programs and various types of data. The portable control section 220 receives a signal commanding actuation of an application program from the manipulating section 240 or the vehicle 100. This causes execution of the application program, which is memorized by the portable memory section 250.

The portable manipulation terminal 200 includes the portable control section 220. The portable control section 220 controls the information communication by the portable communication section 210 and performs various calculations.

The communication control section 160 of the vehicle 100 requests the user identifying information from the portable control section 220. In response to the request, the portable control section 220 controls the portable communication section 210 to transmit the identification number of the portable manipulation terminal 200, which is memorized by the portable memory section 250, to the vehicle 100.

The server 300 includes a server communication section 310 that communicates information with the communication module 130 of the vehicle 100 through the external communication network.

The server 300 includes a server control section 320. The server control section 320 controls the information communication by the server communication section 310 and performs various calculations. When a thermal sensation estimating section 330, which will be described later, estimates the thermal sensation, the server control section 320 controls the server communication section 310 to obtain the user's biological information, the manipulation information, and the vehicle environment information from the vehicle 100.

The server 300 has the thermal sensation estimating section 330 to estimate the thermal sensation, which is an indicator representing how the user senses the temperature environment in the vehicle. The thermal sensation estimating section 330 estimates the thermal sensation based on the user's biological information, the manipulation information, and the vehicle environment information.

The server 300 includes a server memory section 360 that memorizes various types of information. The server memory section 360 is constituted by a user information memory section 340 and a preference memory section 350. The user information memory section 340 consolidates and controls user information. The preference memory section 350 consolidates and controls temperature preference information, which is information representing the user's preference regarding the environmental temperature in the vehicle. The server memory section 360 memorizes associating information that associates the user information with the user's temperature preference information. In other words, the user information memory section 340 and the preference memory section 350 associate the user information with the temperature preference information.

The server 300 includes a user identifying section 380 configured to identify the user. The user identifying section 380 identifies the user by collating the user identifying information with the user information that is memorized by the user information memory section 340. In the present embodiment, the user identifying information is the identification number of the portable manipulation terminal 200.

The server 300 includes a preference estimating section 370. The preference estimating section 370 is configured to estimate the temperature preference, which is the user's preference regarding temperature. The preference estimating section 370 estimates the temperature preference based on the thermal sensation estimated by the thermal sensation estimating section 330.

In the present embodiment, the thermal sensation estimating section 330, the preference estimating section 370, and the preference memory section 350 of the server 300 function as a temperature preference estimating system.

The procedures carried out by the thermal sensation estimating section 330, the preference memory section 350, the preference estimating section 370, and the user identifying section 380 are accomplished by executing corresponding programs that are memorized by a memory (non-transitory computer-readable medium) in the server control section 320 by means of the server control section 320 serving as a computer.

Next, a procedure of estimating the temperature preference by the temperature environment regulating system and the temperature preference estimating system will be described with reference to FIG. 2. The server 300 is constantly in a stand-by state to receive the biological information, the manipulation information, and the vehicle environment information from the communication control section 160 of the vehicle 100. As has been described, when the predetermined time has elapsed since the start of operation of the in-vehicle temperature conditioner 110 of the vehicle 100, the biological information, manipulation information, and vehicle environment information that have been detected during the predetermined time are transmitted to the server 300.

In Step S11 of the procedure of estimating the temperature preference, the server control section 320 of the server 300 obtains the biological information, the manipulation information, and the vehicle environment information. Specifically, the server control section 320 receives signals representing the biological information, the manipulation information, and the vehicle environment information from the communication module 130 of the vehicle 100. The aforementioned types of information received by the server communication section 310 have been detected in the predetermined time, which is set in advance. After the server communication section 310 of the server 300 obtains the signals representing the biological information, the manipulation information, and the vehicle environment information, the server control section 320 performs Step S12 of the procedure.

In Step S12, the server control section 320 of the server 300 causes the thermal sensation estimating section 330 to estimate the thermal sensation of the user based on the obtained biological information, manipulation information, and vehicle environment information. Specifically, the thermal sensation estimating section 330 constitutes a recursive neural network. The user's heart rate and skin temperature, the target passenger-compartment temperature of the vehicle 100 set by the user, and the outside temperature are input to the input layer as the biological information, the manipulation information, and the vehicle environment information, respectively. The thermal sensation estimating section 330 outputs the thermal sensation to the output layer of the recursive neural network.

The thermal sensation is an indicator having five levels defined as follows. The first level of the thermal sensation corresponds to the coldest sensation and is defined as "cold." The fifth level of the thermal sensation corresponds to the hottest sensation and is defined as "hot." The third level of the thermal sensation is intermediate between the first and fifth levels and defined as "neutral." In the present embodiment, the thermal sensations defined as "cold," "hot," and "neutral" are referred to using numerals 1, 5, and 3, respectively. The thermal sensation is thus output as any one of the numerals 1 to 5.

The thermal sensation estimating section 330, which is constituted by a recursive neural network, is a standard model that outputs thermal sensation by simulating in advance a user who is deemed to be average through tests. In other words, the thermal sensation estimated by the thermal sensation estimating section 330 is an indicator representing how an average user would feel cold or hot at the time the biological information, the manipulation information, and the vehicle environment information are input.

By inputting the biological information, the manipulation information, and the vehicle environment information of the vehicle 100 to the thermal sensation estimating section 330, how an average user would feel cold or hot at the time of boarding the vehicle 100 is hypothetically determined depending on the biological information, the manipulation information, and the vehicle environment information. For example, if the user of the vehicle 100 is comparatively sensitive to cold, the set temperature of the in-vehicle temperature conditioner 110 tends to be comparatively high. Therefore, when an average user boards this vehicle 100, the average user would feel hot. In other words, when the thermal sensation corresponding to "hot" is output by the thermal sensation estimating section 330 based on the biological information, the manipulation information, and the vehicle environment information of the vehicle 100, the user of the vehicle 100 is assumed to have a cold-sensitive temperature preference. That is, in Step S12, by inputting the biological information, the manipulation information, and the vehicle environment information of the vehicle 100 to the thermal sensation estimating section 330, the thermal sensation is estimated using an average user who hypothetically boards the vehicle 100.

The thermal sensation estimating section 330 calculates changes in the thermal sensation during the predetermined time by repeatedly estimating the thermal sensation during the predetermined time. A certain time is required for a change to occur in the in-vehicle temperature environment, and the in-vehicle temperature environment is thus assumed to have changed to a temperature environment desired by the user by the time the predetermined time elapses. After the thermal sensation estimating section 330 has estimated the thermal sensation for the predetermined time, the server control section 320 carries out Step S13 of the procedure.

Figure 3:
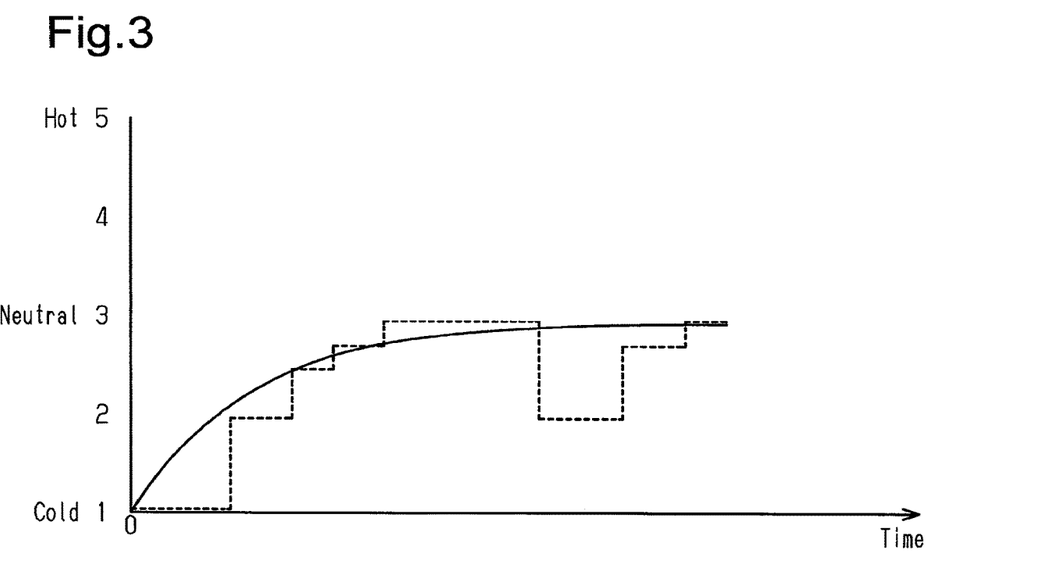
FIG. 3 is a graph representing a procedure of estimating thermal sensation.

In Step S13, the server control section 320 of the server 300 causes the preference estimating section 370 to estimate the user's temperature preference based on temporal changes in the thermal sensation estimated by the thermal sensation estimating section 330 during the predetermined time. Specifically, with reference to FIG. 3, it is now assumed that the temperature in the vehicle is relatively low and the user boards the vehicle 100 and turns on the ignition switch. In this case, in a period shortly after the ignition switch is turned on, the thermal sensation is estimated to be "cold," as represented by the broken lines in FIG. 3. Then, the in-vehicle temperature conditioner 110 operates to raise the in-vehicle temperature as the time elapses, gradually changing the thermal sensation from "cold" to "neutral." The thermal sensation then gradually converges to a constant level. At this time, the preference estimating section 370 generates an approximation with respect to the thermal sensation during the predetermined time, as represented by the solid curve in FIG. 3, using the following equation (1).

$$TF = -(A-1) \times e^{-B \times t} + A \quad (1)$$

TF: Thermal Sensation
A: Final Value
B: Time Constant
t: Time after operation start of in-vehicle temperature conditioner 110

The final value A is the value to which the thermal sensation has converged when the predetermined time has elapsed since the start of operation of the in-vehicle temperature conditioner 110. In other words, the final value A represents the thermal sensation that is estimated when the predetermined time has passed since the start of regulation of the in-vehicle temperature environment. The time constant B represents the speed at which the thermal sensation changes following the start of operation of the in-vehicle temperature conditioner 110. In other words, the time constant B represents the change in the estimated thermal sensation with respect to the time.

The preference memory section 350 memorizes the temperature preference as distributed and classified into five groups in advance. After determining the final value A and the time constant B, the preference estimating section 370 estimates the temperature preference with reference to the distribution of the temperature preference. Specifically, with reference to FIG. 4, the preference estimating section 370 determines to which of the temperature preference groups the final value A and the time constant B that have been obtained in the current cycle of processing correspond. After the preference estimating section 370 estimates the temperature preference, the server control section 320 carries out Step S14 of the procedure.

Figure 4:
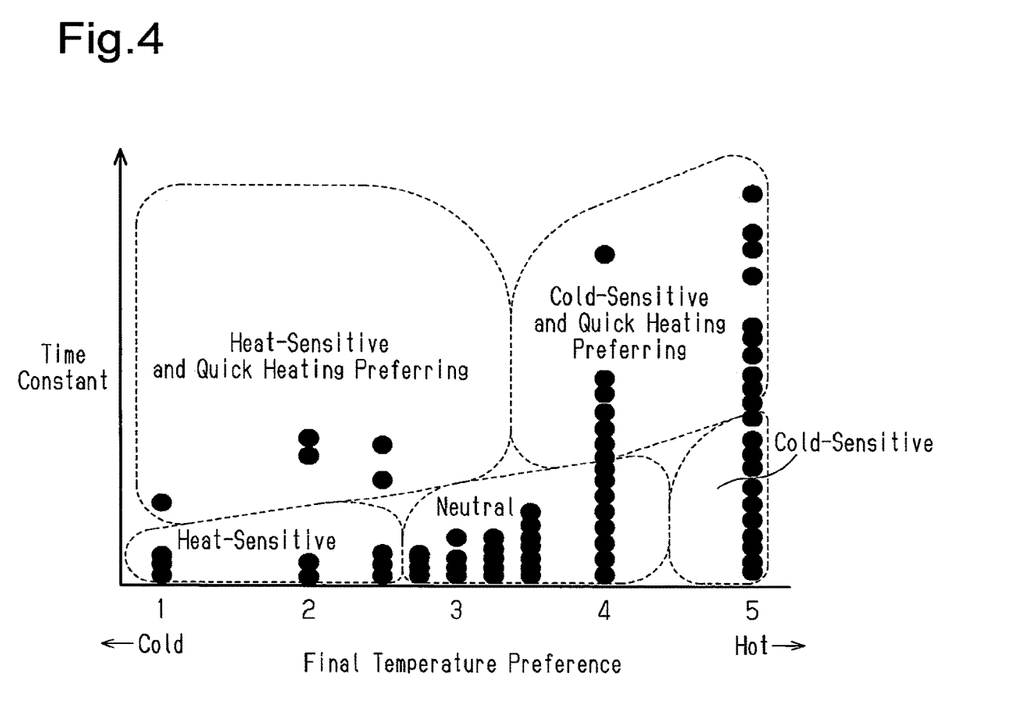
FIG. 4 is a graph representing a procedure of estimating temperature preference.

In the present embodiment, the five groups of temperature preference are defined in advance in correspondence with the final value A and the time constant B. The five groups of temperature preference are a heat-sensitive and quick heating preferring group, a heat-sensitive group, a neutral group, a cold-sensitive group, and a cold-sensitive and quick heating preferring group.

Figure 2:
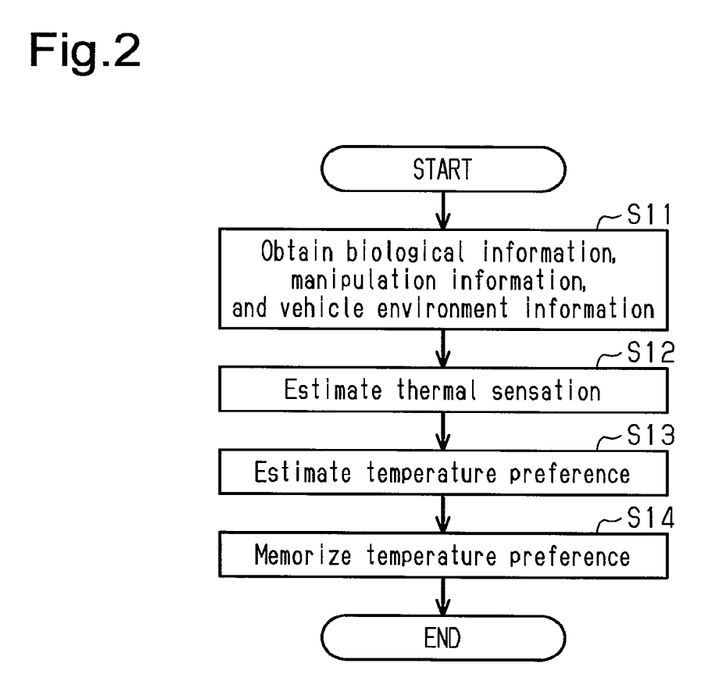
FIG. 2 is a flowchart representing a procedure of estimating temperature preference.

As illustrated in FIG. 2, in Step S14, the server control section 320 of the server 300 causes the preference memory section 350 to memorize the temperature preference estimated by the preference estimating section 370. In the present embodiment, in a case of a user whose temperature preference has been memorized before, the memorized temperature preference is canceled and updated to a new temperature preference. The server control section 320 then ends the current cycle of the temperature preference estimating procedure.

Figure 5:
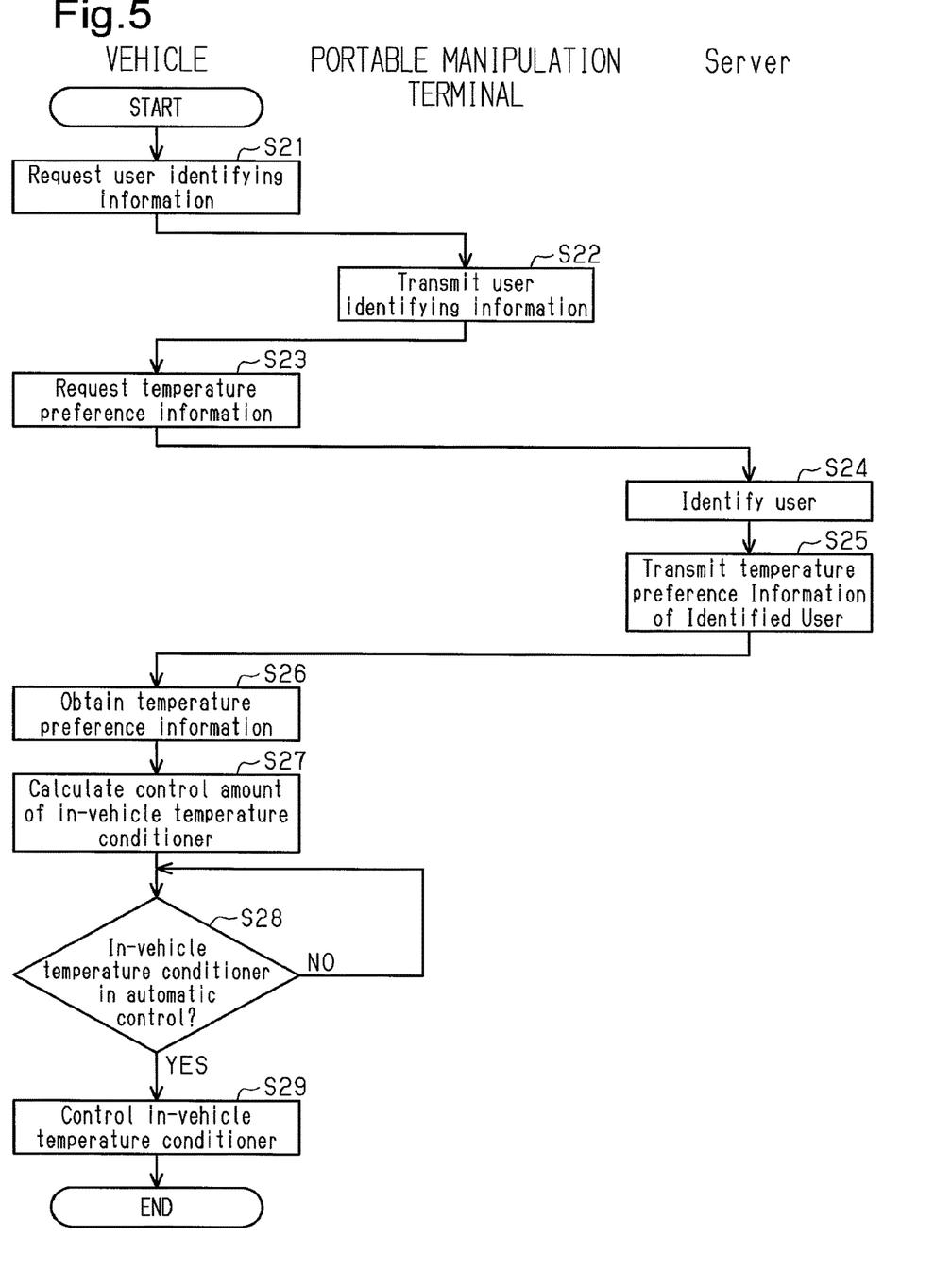
FIG. 5 is a flowchart representing a procedure of controlling regulation of temperature environment.

A procedure of regulating the in-vehicle temperature by the temperature environment regulating system will hereafter be described with reference to FIG. 5.

When the ignition switch of the vehicle 100 is on, the communication control section 160 of the vehicle 100 starts to control the regulation of the in-vehicle temperature of the present embodiment by performing the procedure of regulating the in-vehicle temperature.

In Step S21, the communication control section 160 of the vehicle 100 requests the user identifying information, which is information for identifying the user, from the portable manipulation terminal 200. Specifically, the communication control section 160 transmits a signal requesting the identification number of the portable manipulation terminal 200, as the user identifying information, from the short-range communication section 150 to the portable communication section 210 of the portable manipulation terminal 200 by wireless short-range communication. The processing regarding the vehicle 100 is then shifted to a stand-by state.

In response to the signal requesting the user identifying information, which is received by the portable communication section 210 of the portable manipulation terminal 200 from the short-range communication section 150 of the communication module 130, the portable control section 220 of the portable manipulation terminal 200 starts the processing of Step S22. In Step S22, the portable control section 220 of the portable manipulation terminal 200 transmits a signal representing the identification number of the portable manipulation terminal 200 to the vehicle 100. Specifically, the portable control section 220 transmits the identification number of the portable manipulation terminal 200, which is memorized by the portable memory section 250, from the portable communication section 210 to the communication control section 160 of the communication module 130 by wireless short-range communication. The processing regarding the portable manipulation terminal 200 for the current cycle of in-vehicle temperature regulation is then ended.

In response to the signal representing the user identifying information, which is received by the short-range communication section 150 of the communication module 130 from the portable communication section 210 of the portable manipulation terminal 200, the communication control section 160 of the vehicle 100 starts the processing of Step S23. In Step S23, the communication control section 160 of the communication module 130 requests the temperature preference information from the server 300. Specifically, the communication control section 160 transmits a signal requesting the temperature preference information, together with the identification number of the portable manipulation terminal 200, which is the user identifying information that has been received, from the external communication section 140 to the server communication section 310 of the server 300. The processing regarding the vehicle 100 is then shifted to a stand-by state.

In response to the signal requesting the temperature preference information, which is received by the server communication section 310 of the server 300 from the external communication section 140 of the vehicle 100, the server control section 320 of the server 300 starts the processing of S24. In Step S24, the server control section 320 of the server 300 causes the user identifying section 380 to identify the user by collating the identification number of the portable manipulation terminal 200, which is the user identifying information that has been received, with the user information memorized by the user information memory section 340. The server control section 320 then performs Step S25.

In Step S25, the server control section 320 of the server 300 obtains the temperature preference information associated with the user that has been identified by the user identifying section 380 from the temperature preference information memorized by the preference memory section 350. The server control section 320 transmits a signal representing the temperature preference of the identified user from the server communication section 310 to the vehicle 100. The processing regarding the server 300 for the current cycle of in-vehicle temperature regulation is then ended.

When the signal representing the temperature preference of the identified user is received by the external communication section 140 of the communication module 130 from the server communication section 310 of the server 300, the communication control section 160 of the vehicle 100 starts the processing of Step S26. In Step S26, the communication control section 160 of the communication module 130 inputs the temperature preference information of the identified user to the conditioner ECU 120. The conditioner ECU 120 then carries out Step S27.

In Step S27, the conditioner ECU 120 of the in-vehicle temperature conditioner 110 calculates the control amount of the in-vehicle temperature conditioner 110 based on the temperature preference information of the identified user and the target passenger-compartment temperature set through the manipulation panel 131. Specifically, the conditioner ECU 120 calculates the control amount of the in-vehicle temperature conditioner 110 with reference to a predetermined conditioner control map, based on the temperature preference of the identified user and the target passenger-compartment temperature. The conditioner ECU 120 then performs Step S28.

In Step S28, the conditioner ECU 120 determines whether the in-vehicle temperature conditioner 110 should be operated in an automatic control manner. Specifically, when the automatic control switch 135 is on, the conditioner ECU 120 determines that the in-vehicle temperature conditioner 110 will be operated in an automatic control manner. In contrast, when the automatic control switch 135 is off, the conditioner ECU 120 determines that the in-vehicle temperature conditioner 110 will be operated not in an automatic control manner. When the conditioner ECU 120 determines in Step S28 that the in-vehicle temperature conditioner 110 will be operated not in an automatic control manner (S28: NO), Step S28 is repeated. When the conditioner ECU 120 determines in Step S28 that the in-vehicle temperature conditioner 110 will be operated in an automatic control manner (S28: YES), the conditioner ECU 120 carries out Step S29.

In Step S29, the conditioner ECU 120 controls the calculated control amount through the in-vehicle temperature conditioner 110. In other words, the conditioner ECU 120 controls the in-vehicle temperature conditioner 110 based on the temperature preference information of the identified user and the target passenger-compartment temperature set through the manipulation panel 131. The conditioner ECU 120 then ends the current cycle of procedure of regulating the in-vehicle temperature.

The operation of the present embodiment will hereafter be described.

In a case of a first-time user of the vehicle 100, the server 300 does not have any memory of temperature preference corresponding to this user. Therefore, presumably, the first-time user controls the in-vehicle temperature conditioner 110 manually to match the user's temperature preference. On the other hand, the vehicle 100 continuously detects biological information, manipulation information, and vehicle environment information in the predetermined time (an hour) following the start of temperature regulation by the in-vehicle temperature conditioner 110. When the predetermined time has elapsed, the vehicle 100 transmits the aforementioned types of information to the server 300. The server 300 then estimates the temperature preference of the user based on the received information and, at this time, memorizes the user's temperature preference.

Afterwards, next time the user boards the vehicle 100, the in-vehicle temperature conditioner 110, when controlled in a fully automatic manner, receives the user's temperature preference that has been estimated in correspondence with the information obtained in the previous time of driving from the server 300. The in-vehicle temperature conditioner 110 is thus controlled based on the user's temperature preference that has been received.

It is assumed that the user boards a vehicle different from the vehicle 100, which the user has boarded in the previous time. Even in this case, if the vehicle of the current boarding has a configuration identical with that of the vehicle 100 of the present embodiment in terms of the temperature environment system, the server 300 transmits the user's temperature preference that has been estimated in correspondence with the information from the previous time of driving the vehicle 100.

The present embodiment has the following advantages.

(1) In the present embodiment, the temperature environment regulating system determines and memorizes the temperature preference, which is each user's preference regarding the environmental temperature in the vehicle. The in-vehicle temperature conditioner 110 is then controlled based on the memorized temperature preference. This ensures a comfortable in-vehicle temperature environment for each user, regardless of variation in the temperature preference from one user to another.

(2) In the present embodiment, the temperature environment regulating system estimates the user's temperature preference each time the ignition switch is turned on. In other words, the temperature preference of the user is estimated for each trip, that is, for each time of boarding by the user. The in-vehicle temperature conditioner 110 is controlled based on the most recent temperature preference of the user that has been identified. Therefore, even if the temperature preference of the user changes depending on seasons, the in-vehicle temperature conditioner 110 is controlled in a manner regulated in correspondence with such changes.

(3) In the present embodiment, the in-vehicle temperature conditioner 110 is controlled in correspondence with the temperature preference of the user who has been identified by the user identifying section 380. Therefore, even if the vehicle 100 has different users, the in-vehicle temperature environment is regulated in correspondence with the temperature preference of each of the users. For example, in a case in which the vehicle 100 is used by multiple users, each of the users is identified in correspondence with the portable manipulation terminal 200 owned by the user. This ensures regulation of the in-vehicle temperature environment based on the temperature preference of the identified user.

(4) In the present embodiment, even if the user switches to another vehicle 100, which is different from the vehicle 100 that the user has used previously, the current vehicle 100 receives the temperature preference of the user from the server 300. This ensures the controlling of the in-vehicle temperature conditioner 110 in correspondence with the state of air conditioning in the vehicle that the user is currently in, even if the user switches to another vehicle. Also, the procedure of estimating the temperature preference for a user is performed regardless of which of the vehicles 100 the user uses. For example, if the user uses a second vehicle but not a first vehicle for a relatively long time, the user's temperature preference is estimated with regard to the second vehicle. Therefore, when the user uses the first vehicle afterwards, the in-vehicle temperature conditioner 110 is controlled based on the most recent temperature preference of the user. This ensures a further comfortable in-vehicle temperature environment for the user.

(5) In the present embodiment, classification of the temperature preference is based on not only the temperature preference regarding a stabilized temperature that is achieved when the predetermined time has elapsed since the start of regulation of the in-vehicle temperature environment, but also the information obtained in the period from when the regulation of the in-vehicle temperature environment is started to when the temperature is stabilized. Specifically, the temperature preference is estimated using the final value A, which is determined based on the change in the estimated thermal sensation as the time elapses, and the time constant B. Therefore, the estimated temperature preference reflects not only the temperature preference regarding the stabilized temperature, which indicates whether the user is sensitive to heat or cold, but also the preference of the user regarding how the in-vehicle temperature environment should change, which may indicate, for example, that the user prefers quick heating of the in-vehicle temperature environment, that is, exhibiting a quick heating preference.

(6) In the present embodiment, the temperature preference estimating system determines and memorizes the temperature preference of the user regarding the passenger-compartment temperature environment of the vehicle 100. The temperature preference is thus collected in association with the information on each of the users of the vehicle 100. Therefore, the collected information will be used to develop future in-vehicle temperature conditioners. For example, information on multiple users may be used to classify the users into different groups of sexes and body types. This may allow determining which of the user groups tends to use a specific type of vehicles. In this manner, the in-vehicle temperature conditioner of a vehicle of this type can reflect the temperature preference of the corresponding user group, thus ensuring a comfortable in-vehicle temperature environment.

The above-described embodiment may be modified as follows. The present embodiment and the following modifications can be combined as long as the combined modifications remain technically consistent with each other.

The information that the user identifying section 380 uses to identify the user is not restricted to the example in the present embodiment. The user identifying section 380 may identify the user using, for example, a telephone number or information registered in an application, instead of the identification number of the portable manipulation terminal 200. In other cases, the vehicle 100 may have multiple electronic keys owned by respective users. In these cases, the identification numbers of the electronic keys may be used by the user identifying section 380 to identify each of the users.

The means by which the user identifying section 380 obtains information for identifying the user is not restricted to the example in the present embodiment. For example, the user may manually manipulate the manipulating section 240 of the portable manipulation terminal 200 to a corresponding user ID or password.

The user identifying section 380, the user information memory section 340, and the preference memory section 350 may be mounted at any suitable position in the temperature environment system. For example, the user identifying section 380, the user information memory section 340, and the preference memory section 350 may be mounted in the vehicle 100. In this case, the vehicle 100 identifies the user and determines the temperature preference of the identified user.

The user identifying section 380 may be omitted. For example, if the temperature preference of the user is estimated on the assumption that the vehicle 100 is used constantly by the same user, identifying the user is unnecessary.

The wireless short-range communication, which is used as the communication method between the vehicle 100 and the portable manipulation terminal 200, is not restricted to the example in the present embodiment. The wireless short-range communication may be, for example, near field communication (NFC) or radio frequency identifier (RFID) communication.

The communication method between the vehicle 100 and the portable manipulation terminal 200 does not necessarily have to be wireless short-range communication. For example, the portable manipulation terminal 200 and the vehicle 100 may be connected to each other through an external communication network. In this case, the information for identifying the user is transmitted to the vehicle 100 through the external communication network before the user boards the vehicle 100.

The approximation used by the preference estimating section 370 to calculate the final value A and the time constant B is not restricted to the example in the present embodiment. The estimated thermal sensation, which is represented by the broken lines in FIG. 3, may start to change from "cold" in some cases and from "hot" or "neutral" in other cases. The employed approximation may thus be modified as needed in correspondence with the estimated thermal sensation. For example, even when the outside temperature is low, the thermal sensation of a user who has been performing physical activity may be estimated as "hot," not "cold." In this case, an intercept may be incorporated in the employed approximation. Also, the approximation of the present embodiment is for an assumed case in which the outside temperature is low and the environment in the vehicle needs to be heated. Therefore, for an assumed case in which the outside temperature is high and the environment in the vehicle needs to be cooled, the approximation illustrated in FIG. 3 is reversed in the up-down direction in a line-symmetric manner with respect to the line corresponding to "neutral" of thermal sensation. Further, the employed approximation may be any other function such as a sigmoid function.

The classification of the thermal sensation for estimating the temperature preference is not restricted to the example in the present embodiment. Specifically, the thermal sensation may be classified into two to four groups or six or more groups. The thermal sensation may be classified into any suitable number of groups as long as there are at least two such groups.

The preference memory section 350 does not necessarily have to cancel a previous temperature preference before memorizing an updated temperature preference. For example, temperature preferences may be accumulated for a year after each of the temperature preferences is memorized. This allows determining how the temperature preference of the user changes in the year. In this case, the temperature preference used to control the in-vehicle temperature conditioner 110 may use either the most recent temperature preference or the temperature preference from the same season a year before.

The predetermined time is not restricted to the example in the present embodiment and may be less or more than an hour. The predetermined time may be of any suitable length as long as the time is at least greater than the time needed for the in-vehicle temperature conditioner 110 to ensure a comfortable in-vehicle temperature environment for the user.

The biological information of the user is not restricted to the example in the present embodiment. The biological information may be, for example, the amount of perspiration by which the user perspires, the number of blinking by which the user blinks, the body type of the user including the height or width of shoulders, or the amount of clothing that the user is dressed by. The biological information of the user may be of any suitable type as long as the biological information is related at least to the thermal sensation of the user such as hot and cold sensations.

The manipulation information is not restricted to the example in the present embodiment. For example, manipulation information regarding a power window of the vehicle 100 and/or manipulation information regarding an air-amount regulating button of the air-conditioning mechanism 111 may be employed, instead of or in addition to the manipulation information illustrated in the above-described embodiment by way of example. In other words, the manipulation information may be of any suitable type as long as the manipulation information is related at least to a device that affects the in-vehicle temperature environment of the vehicle 100.

The configuration of the in-vehicle temperature conditioner 110 is not restricted to the example in the present embodiment and may lack one or some of the devices or have an additional device (additional devices). For example, the in-vehicle temperature conditioner 110 may include a ventilation mechanism for ventilating the interior of the vehicle. Alternatively, the in-vehicle temperature conditioner 110 may be constituted by any one of the air-conditioning mechanism 111, the steering heater 112, the seat ventilation mechanism 113, and the seat heater 114.

The configuration of the manipulation panel 131 is not restricted to the example in the present embodiment and may be modified as needed depending on the configuration of the in-vehicle temperature conditioner 110. Specifically, if the air amount by which the seat ventilation mechanism 113 supplies air can be regulated, the seat ventilation switch may be a button that can be manipulated to regulate the air intensity. In this case, information representing the air intensity corresponds to a type of manipulation information.

The vehicle environment information is not restricted to the example in the present embodiment and may be, for example, information representing precipitation or altitude. The vehicle environment information may be of any suitable type as long as the vehicle environment information is related at least to the external environment of the vehicle 100.

The thermal sensation estimating section 330 may estimate the thermal sensation based on at least one of the biological information of the user, the manipulation information, and the vehicle environment information. The thermal sensation estimating section 330 does not necessarily have to use all of the aforementioned types of information to estimate the thermal sensation. For example, the thermal sensation estimating section 330 may estimate the thermal sensation using only the biological information of the user or using the manipulation information and the vehicle environment information.

The temperature environment regulating system may be constituted without employing the portable manipulation terminal 200 or the server 300. For example, the communication control section 160 of the vehicle 100 may include the thermal sensation estimating section 330, the preference memory section 350, the preference estimating section 370, and the user identifying section 380.

The vehicle 100 may lack the temperature environment regulating system and include only the temperature preference estimating system. In other words, the temperature preference may be estimated but the in-vehicle temperature conditioner 110 may be controlled without using the estimated preference. Even in this case, the temperature preference of the user regarding the passenger-compartment temperature environment of the vehicle 100 can be determined and memorized.

The temperature preference estimating program, according to which the server control section 320 of the server 300, the thermal sensation estimating section 330, and the preference estimating section 370 each perform the corresponding processing, do not necessarily have to be memorized by the component that has been described for the present embodiment by way of example. For example, the temperature preference estimating program may be memorized in the portable memory section 250 of the portable manipulation terminal 200 or a non-transitory computer-readable medium in the communication control section 160 of the vehicle 100.

The conditioner ECU 120 and the server 300 are not limited to devices that include a CPU and a memory and execute software processing. For example, at least part of the processes executed by the software in each of the above-described embodiments may be executed by hardware circuits dedicated to the execution of these processes (such as ASIC). That is, the conditioner ECU 120 and the server 300 may be modified as long as they have any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A temperature environment regulating system comprising:
    an in-vehicle temperature conditioner configured to regulate a passenger-compartment temperature environment in a vehicle;
    a thermal sensation estimating section configured to estimate thermal sensation, which is an indicator representing how a user senses an in-vehicle temperature environment, based on at least one of biological information of the user, manipulation information, which is information regarding manipulation of the vehicle by the user, and vehicle environment information, which is information regarding external environment of the vehicle;
    a preference estimating section configured to estimate temperature preference of the user based on a temporal change in the thermal sensation, wherein the thermal sensation is determined based on $TF=-(A-1)\times e^{-B\times t}+A$, wherein TF is the thermal sensation, A is a final value to which the thermal sensation has converged when a predetermined time has elapsed since a start of operation of the in-vehicle temperature conditioner, B is a time constant representing a speed at which the thermal sensation changes following the start of the operation of the in-vehicle temperature conditioner, and t is a time after the start of the operation of the in-vehicle temperature conditioner;
    a preference memory section configured to memorize the temperature preference; and
    a control section configured to control the in-vehicle temperature conditioner,
    wherein the control section is configured to control the in-vehicle temperature conditioner based on the temperature preference memorized by the preference memory section.

2. The temperature environment regulating system according to claim 1, further comprising a user identifying section configured to obtain user identifying information for identifying a user and identify the user based on the user identifying information, wherein
    the preference memory section memorizes the temperature preference in association the user identifying information, and
    when the user identifying section identifies the user, the control section controls the in-vehicle temperature conditioner based on the temperature preference associated with the identified user.

3. The temperature environment regulating system according to claim 2, wherein
    a server including the preference memory section and a communication module mounted in the vehicle are connected to each other through an external communication network, and
    when the user identifying section identifies the user, the control section receives the temperature preference associated with the identified user from the server by means of the communication module and controls the in-vehicle temperature conditioner based on the temperature preference.

4. The temperature environment regulating system according to claim 1, wherein the preference estimating section estimates air-conditioning preference of the user based on the temporal change in the estimated thermal sensation and a thermal sensation estimated when the predetermined time has elapsed since start of operation of the in-vehicle temperature environment.

5. A temperature preference estimating system comprising:
    a thermal sensation estimating section that estimates thermal sensation, which is an indicator representing how a user senses an in-vehicle temperature environment, based on at least one of biological information of the user, manipulation information, which is information regarding manipulation of the vehicle by the user, and vehicle environment information, which is information regarding external environment of the vehicle;
    a preference estimating section that estimates temperature preference of the user based on a temporal change in the thermal sensation, wherein the thermal sensation is determined based on $TF=-(A-1)\times e^{-B\times t}+A$, wherein TF is the thermal sensation, A is a final value to which the thermal sensation has converged when a predetermined time has elapsed since a start of operation of an in-vehicle temperature conditioner, B is a time constant representing a speed at which the thermal sensation changes following the start of the operation of the in-vehicle temperature conditioner, and t is a time after the start of the operation of the in-vehicle temperature conditioner; and
    a preference memory section that memorizes the temperature preference.

6. A non-transitory computer-readable medium storing a program that causes a computer to execute:

a thermal sensation estimating process that estimates thermal sensation, which is an indicator representing how a user senses an in-vehicle temperature environment, based on at least one of biological information of the user, manipulation information, which is information regarding manipulation of the vehicle by the user, and vehicle environment information, which is information regarding external environment of the vehicle;

a preference estimating process that estimates temperature preference of the user based on a temporal change in the thermal sensation, wherein the thermal sensation is determined based on $TF=-(A-1)\times e^{-B\times t}+A$, wherein TF is the thermal sensation, A is a final value to which the thermal sensation has converged when a predetermined time has elapsed since a start of operation of an in-vehicle temperature conditioner, B is a time constant representing a speed at which the thermal sensation changes following the start of the operation of the in-vehicle temperature conditioner, and t is a time after the start of the operation of the in-vehicle temperature conditioner; and a preference memory process that memorizes the temperature preference.

\* \* \* \* \*